ANALOG-TO-DIGITAL ENCODER

Filed Feb. 15, 1963 3 Sheets-Sheet 1

INVENTORS
CHAI B. BYUN
KENNETH F. RENDLER
BY G. Seeves [signature]

ATTORNEY

Nov. 15, 1966 C. B. BYUN ET AL 3,286,251

ANALOG-TO-DIGITAL ENCODER

Filed Feb. 15, 1963 3 Sheets-Sheet 2

3,286,251
ANALOG-TO-DIGITAL ENCODER

Chai B. Byun, Los Angeles, and Kenneth F. Rendler, La Crescenta, Calif., assignors to General Precision, Inc., a corporation of Delaware Filed Feb. 15, 1963, Ser. No. 258,827
13 Claims. (Cl. 340—347)

This invention relates to analog-to-digital encoders, and more particularly to a new and improved self-selecting nonambiguous analog-to-digital encoder.

Ambiguity has long been a problem in analog-to-digital converters or encoders. Several solutions to the ambiguity problem have been developed heretofore, such as the V-scan and U-scan in both serial and parallel readout. Systems of self-selecting U-scan and V-scan arrangements have also been developed and today are well known in the art. Some of the disadvantages of the self-selecting non-ambiguous encoders are the complicated disk patterns and the necessity of many extra brushes per digit track or zone. Friction and wear problems between the brushes and disk are increased over the V-scan which requires only two brushes per track, with the exception of the least significant track which utilizes only a single brush. More or less conventionally, the self-selecting encoder energizes each digit track in accordance with the readout from the least significant track. In order to isolate both the track and the segment being read from improperly energizing a higher order track or segment, it has been necessary to separate each track or segment from the other by means of a diode. Accordingly, the forward resistance of one diode is introduced for each zone, and thus the voltage on any output line is a function of the series diode resistances in all output lines in the encoder. Consequentially, appropriate circuitry is required to compensate for the decreasing voltage applied to the higher order tracks and segments due to the series resistance of the succeeding diodes. Attempts have been made to overcome this objection but have proven more or less unsatisfactory because of the necessity of going to a much more complicated pattern, as well as to the utilization of a plurality of isolated segments within the pattern of each digit track.

A further objection to present self-selecting non-ambiguous encoders is that when it is necessary to go to a higher order encoder than the desired size of the disk will permit, difficulties arise in the energizing of the second disk. It has been found impossible or difficult to energize the higher order tracks of the second or higher order disk, unless a separate switching arrangement or complex circuitry was provided to switch from the lower order disk to the higher order disk was provided.

The present invention overcomes the objection of both the non-ambiguous V-scan and U-scan with their extensive readout circuitry and the objections of the conventional non-self-selecting encoders by providing a simple straightforward information member or encoder disk with very few isolated segments. A least significant track is provided with a common connector link and two binary coded patterns electrically isolated from each other and from the least significant track. The isolation diodes for each track are in parallel, and since only one pattern is enabled at a time in accordance with the condition of the least significant track, only one isolation diode is in the circuit at any particular readout time. Consequently, compounded or series forward resistance is greatly reduced in this invention and the voltage drop caused by the diode in the circuit is the same for each readout track.

Briefly described, the present invention comprises a self-selecting analog-to-digital encoder having three separate and mutually insulated code patterns on one side of the commutator code disk. Two of these patterns are binary coded patterns, electrically isolated from each other, that provide two separate binary codes to full count, each occupying approximately one half of the 360° disk pattern, while the third pattern, the least significant digit or control track, occupies a full 360° Either one or the other of the binary coded patterns is enabled or excited in accordance with the condition of the control track. Readout brushes positioned on the tracks of each coded pattern will therefore be energized only by the particular pattern that is enabled.

There is also provided a simple and very unique system of selectively switching to each of the two coded pattern sections on the higher order disk or disks. This switching is done by brushes on the most significant track of the lower order disk, rather than by the least significant or control track. This invention also makes it possible to utilize the same disk pattern for the lowest order disk on all of the subsequent higher order disks.

The object of this invention is to provide a shaft position to digital encoder that is self-selecting and non-ambiguous, which is provided with a very simple coded disk and brush arrangement.

Other objects and features of this invention will become more fully apparent as the disclosure proceeds in the following detailed description of a preferred embodiment of this invention, as illustrated in the drawings in which.

Figure 1:
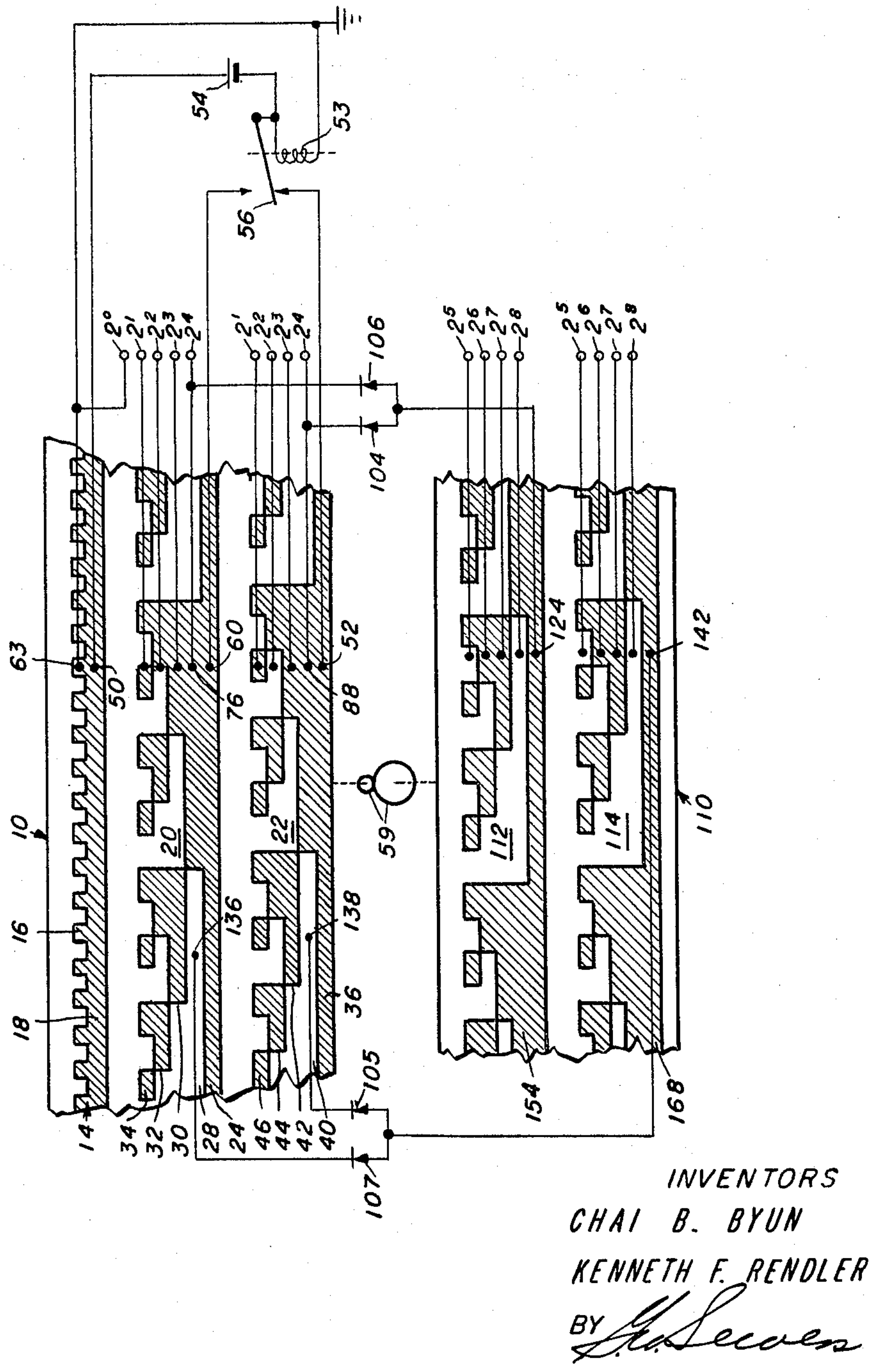
FIGURE 1 is a simplified linear presentation of the coded patterns and brush arrangement of this invention.
Figure 2:
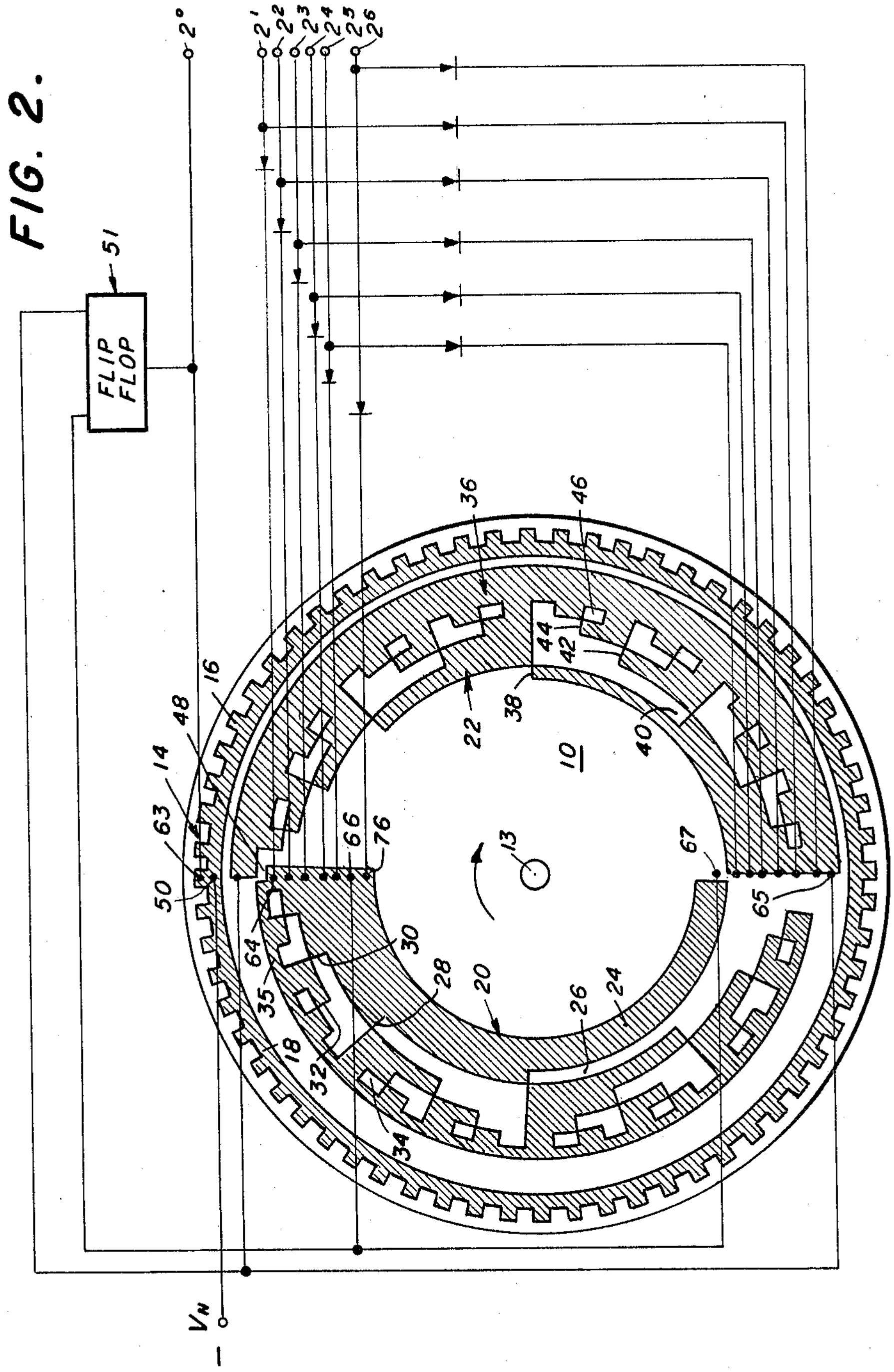
FIGURE 2 is a circuit diagram and disk pattern of a preferred embodiment of this invention.
Figure 3:
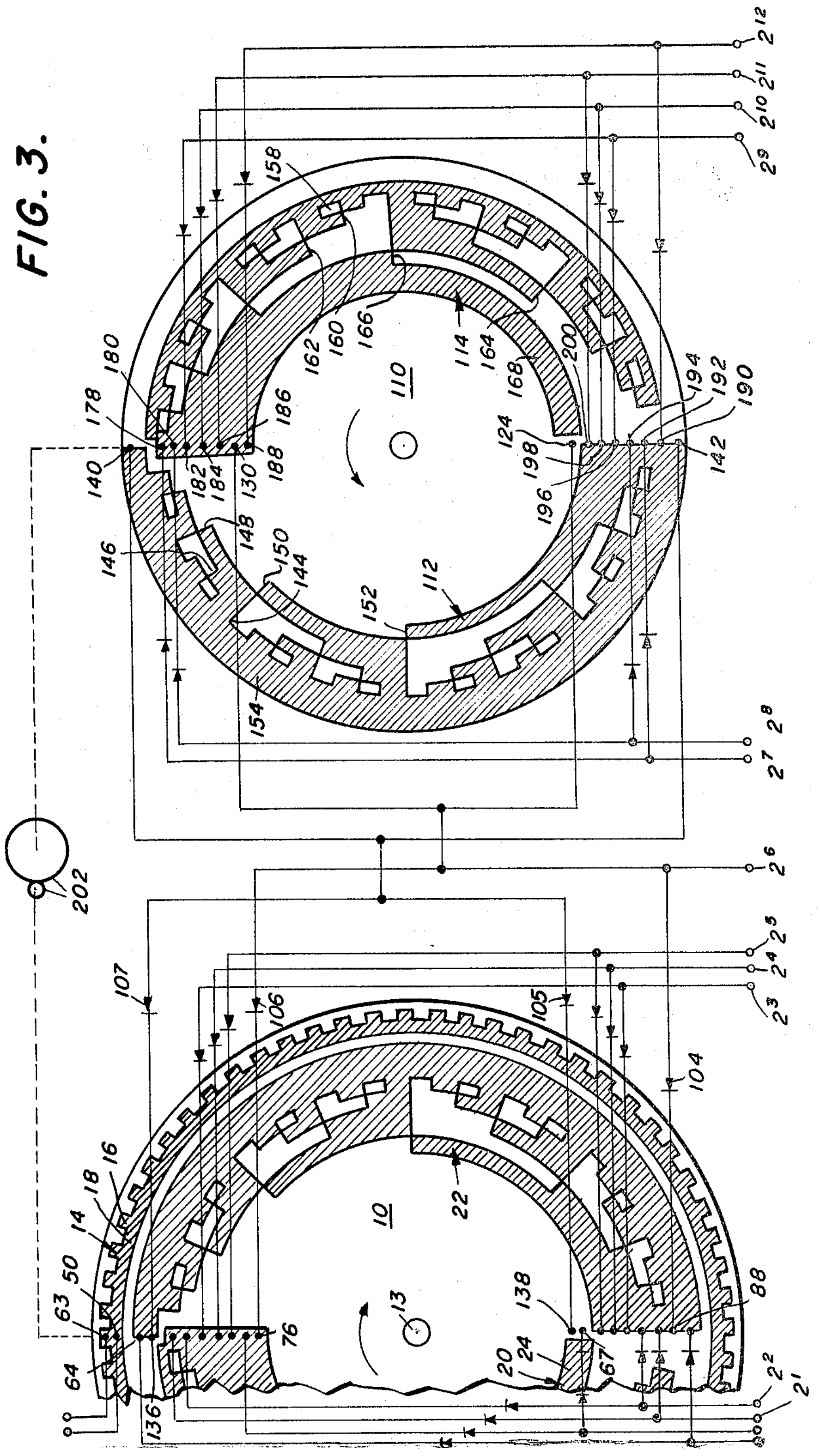
FIGURE 3 is a circuit diagram showing the disk pattern of the principal embodiment of this invention illustrating the invention as applied to a 13 bit encoder with two disks.

Referring now to the drawings wherein like numerals designate like or corresponding parts throughout the several views, all cross-hatched areas are conductive and all areas not cross-hatched are non-conductive. FIGURE 1 is a simplified linear presentation illustrating the various coded patterns, the non-ambiguity principle and typical brush positions to accomplish readout and excitation. It is to be understood that this linear presentation is primarily for simplification and that the invention, while applicable to drums, tapes, and other forms, is best adapted to use on disks, as shown in FIGURES 2 and 3.

To illustrate the invention, FIGURE 1 shows two binary coded sectors designated as 10 and 110, respectively, that are geared together so that disk 110 will move linearly at $\frac{1}{16}$th the rate of disk 10, which is positioned by an outside source. Coded disks or sectors 10 and 110 of the linear presentation of FIGURE 1 are considered as identical, for the purpose of simplicity, to the coded disks 10 and 110 of FIGURES 2 and 3. Disk 10 is provided with a coded control pattern 14 which includes the least significant track 16 and a continuous conductive common track 18. Disk 10 is also provided with two binary coded patterns 20 and 22, each comprised of an electrically conductive material arranged so that all conductive segments in each pattern are mutally conductive, but each individual pattern is mutually insulated from the other coded pattern.

Binary coded pattern 20 is comprised of a plurality of tracks 24, 28, 30, 32 and 34, each containing conductive segments arranged to form a binary pattern with the second least significant track 34 lying adjacent of the least significant track 16, as shown by the cross-hatched portions in FIGURE 1

Similarly, binary coded pattern 22 is comprised of a plurality of tracks 40, 42, 44 and 46, each containing conductive segments identical to those of pattern 20 with the second least significant track being designated as track 46, but skewed from pattern 20 by an amount equal to the length of one control segment in least significant track 16, or one bit time.

As shown in FIGURE 1, a readout brush is associated with each track in each pattern on disk 10. Readout brush 63, which contacts the conductive segments of least significant track 16 provides a binary weighted output of 2°. The readout brush associated with the next significant track 34 will provide a binary weighted output of $2^1$; the brush associated with track 32 will provide a binary weighted output of $2^2$; the brush on track 30 will provide a binary weighted output of $2^3$; and the brush 76 on track 28 will provide a binary weighted output of $2^4$. Similarly, the brushes associated with the various tracks in pattern 22 will provide binary weighted outputs identical to those in pattern 20. An ambiguity arises, however, when the readout brushes are positioned at the line of demarcation between a conductive and nonconductive segment. For example, it can be seen that the brushes associated with tracks 32 and 34 appear to be at this line of demarcation and could therefore produce erroneous results. The readout brushes associated with pattern 22, on the other hand, are positioned at the center of their respective segments and are thus incapable of producing erroneous readouts. It is therefore apparent that a nonambiguous readout can only be accomplished by reading the brushes associated with pattern 22 and disenabling the coded pattern 20 so that brushes associated with tracks 28, 30, 32 and 34 are not energized. This is accomplished by energizing enabling pattern 22 and energizing or disabling pattern 20 in response to the particular condition of the coded control pattern 14 or the least significant bit track 16.

Control pattern 14 is provided with a brush 50 which makes continuous contact with conductive common track 18, and a brush 63 which makes contact with the segments in the least significant track 16. To illustrate the operation, brush 63 is shown connected in a circuit comprising a relay coil 53, a battery 54 and brush 50 on common track 18. When brush 63 makes contact with a conductive segment in the least significant track 16 the resulting current through relay coil 53 will actuate relay armature 56 to apply the voltage from battery 54 to brush 52 which is in contact with a common track 36 of pattern 22. When track 36 is thus enabled, all conductive segments in pattern 22 are similarly enabled and all brushes associated with pattern 22 will produce a readout. By thus exciting relay coil 53 it is apparent that only pattern 22 is enabled or energized and all brushes associated with pattern 20 are inactivated because the coded pattern 20 is disenabled. It will thus be seen that the binary readout in the position illustrated will be 11011. It should be noted that relay 53 and battery 54 are illustrative only and that more rapid and reliable results can be obtained by replacing the relay and battery with a suitable electronic flip-flop and its associated power supply.

When the disk 10 is moved one full bit to either the right or left of that illustrated in FIGURE 1, the brush 63 of the least significant track 16 will be nonenergized or disenabled. This in turn will cause the relay 53 to go high or close the contact feeding the brush 60 and at the same time opening the contact which feeds brush 52. Coded pattern 22 will then become disenabled and coded pattern 20 will become enabled or energized and all conductive segments of pattern 20 are similarly enabled and all brushes associated with coded pattern 20 will produce a voltage readout. If the disk is moved one bit to the left the binary readout will be 11100 and if to the right one bit, the binary readout will be 11010.

In order to increase the output capabilities of the encoder, it is desirable to add one or more higher order disks, such as disk 110 in FIGURE 1. Since the most significant output number read by disk 10 is binary weighted $2^4$, or 16 binary bits, the next higher order disk 110 is geared to the lower order disk 10 by gears 59 having a ratio of 16 to 1 so that disk 110 will move at 1/16 the rate of disk 10. Disk 110 is constructed with two coded patterns 112 and 114 which are identical with patterns 20 and 22 of disk 10. Brushes associated with the least significant tracks of patterns 112 and 114 will therefore provide an output that is binary weighted $2^5$; the next most significant track will provide an output of $2^6$; the next track will provide an output of $2^7$; and the most significant tracks will provide an output of $2^8$.

The same problem in ambiguity exists in connection with disk 110 as existed in connection with disk 10. In order to provide for a nonambiguous readout, it is necessary to excite either pattern 112 or pattern 114 at a time when the associated brushes are safely spaced from the demarcation lines between the conductive and nonconductive segments of each track. If patterns 112 and 114 were enabled in accordance with the particular state of least significant track 16 of disk 10 an ambiguous readout would occur because each of patterns 112 and 114 would be enabled 16 times every least significant bit of disk 110. In order to properly and alternately enable patterns 112 and 114 each one bit length of disk 110, the excitation is supplied from brushes 76 and 136 in track 28 and brushes 88 and 138 in track 40, the most significant tracks of patterns 20 and 22 of disk 10. Brush 76 which provides the binary weighted $2^4$ output from pattern 20 and brush 88 which provides the $2^4$ output from pattern 22 are connected through blocking diodes 106 and 104, respectively, to feed brush 124 which makes contact with common track 154 in pattern 112 of disk 110. It is necessary that diodes 104 and 106 are in the circuit to prevent the false excitation of the disabled pattern from the enabled pattern. Brushes 136 and 138 in tracks 28 and 40, respectively, are positioned from brushes 76 and 88 in the same tracks by an amount equal to one half the binary cycle. Brushes 136 and 138 are connected to the cathodes of diodes 107 and 105, respectively, the anodes of which are commonly connected to brush 142 in the common track 168 of pattern 114. When brushes 76 or 88 are on a conductive segment on disk 10, pattern 112 of disk 110 is thus enabled. When brushes 136 or 138 are on conductive segments, then pattern 114 of disk 110 is enabled. It is now apparent that the higher order brushes of disk 110 will produce a nonambiguous readout from only the particular pattern 112 or 114, whichever is enabled.

Having thus explained the principle of operation illustrating this invention by the use of the simplified linear presentation of FIGURE 1, attention is directed to FIGURE 2 which illustrates a disk pattern and brush arrangement of a 7 bit encoder disk 10 that has a pattern on one surface thereof, and which is generally rotated by shaft 13. For a clear understanding of the manner in which this encoder operates, disk 10 is considered to rotate in a clockwise direction as indicated by the arrow. Disk 10 has three separate and mutually insulated code patterns on its surface. The first code pattern located on the outer periphery of disk 10 is the control pattern 14 which includes a least significant track 16 and a conductive common track 18.

The remaining two coded patterns are designated as the left coded patttern 20 and the right coded pattern 22. The left coded pattern 20, electrically isolated from the control pattern 14 as well as from the right coded pattern 22, contains six digit tracks, wherein the most significant track 24 is located adjacent the center of the disk and each of the five succeeding digit tracks 26, 28, 30, 32 and 34 digress in binary value. Preferably, a small second common track 35 is provided to give better electrical conductivity to all of the segments and tracks around the outer periphery of the left coded pattern 20.

The right coded pattern 22 is similar to the left coded pattern 20 with the exception that its most significant digit track 36 is placed adjacent the outermost perimeter of disk 10. The remainder of the five digit tracks 38, 40, 42, 44 and 46 also digress in binary value from the center of the disk 10 outwardly with the next least significant track 46 lying next to the most significant digit track 36, the second least significant digit track being designated by the numeral 44, the third least significant digit track being designated by the numeral 42, the fourth least significant digit track being designated by the numeral 40, and the fifth least significant track being designated by the numeral 38.

The left pattern 20 and the right pattern 22 are slightly skewed from one another, with the most significant track 36 of the right pattern 22 slightly overlapping the edge of the next to the least significant track 34 of the left pattern 20, as shown at 48. The purpose of this skewing is to provide the nonambiguous readout as previously explained in connection with FIGURE 1.

The tracks of the right pattern 22 and left pattern 20 are enabled in accordance with the condition of control pattern 14. An excitation voltage is applied to brush 50 which contacts common track 18. If brush 63, which contacts the conductive segments in the least significant track 16, is upon a conductive segment, flip-flop 51 will actuate to enable right pattern 22. Similarly, if brush 63 is on a non-conductive segment, flip-flop 51 will reverse to enable left pattern 20. The operation of the flip-flop is similar to the operation of the relay that was described in connection with FIGURE 1.

As disk 10 is rotated, the right and left patterns 22 and 20 are enabled and disabled in sequence each time the least significant segments change from high to low to assure that a non-ambiguous readout will occur from the brushes in the various coded tracks on the disk.

With the disk configuration, as shown in FIGURE 2, all brushes are positioned in a straight line along the diameter of the disk. As noted previously, two brushes are associated with the coded control pattern 14: brush 50 contacts common track 18 to supply an excitation voltage and brush 63 contacts the least significant digit track 16 to provide an output of $2^0$ and also to trigger flip-flop 51. Flip-flop 51 enables either left pattern 20 or right pattern 22 through brushes 64 and 65 or brushes 66 and 67. These brushes are enabling brushes only; all other brushes are readout brushes. It can be seen that the overlapping portion 48 of the most significant digit track 36 of pattern 22 is provided to assure that contact at the proper time only is made by brushes 64 and 65. As disk 10 is rotated, either brush 64 or 65 is always making electrical contact with track 36. Similarly, either of brushes 66 or 67 is always making contact with track 24 of pattern 20.

Readout of the disk 10 of FIGURE 2 is accomplished in the same manner as previously described in connection with FIGURE 1; only those brushes that are in contact with the particular pattern that is enabled will produce an output. The outputs of the various corresponding brushes in the corresponding tracks may be connected together through blocking diodes, as shown in FIGURE 2, to provide a nonambiguous 7 bit output from the encoder disk. The purpose of the diodes is to assure that any brush contacting an enabled segment will not feed back to energize the disabled pattern.

To convert to a 13 bit encoder, as shown in the principle embodiment of FIGURE 3, or to an encoder wherein a larger binary output or higher bit count might be desired that would cause the number of tracks required to be overcrowded on a single disk, a second commutator disk 110 is used which has a pair of coded patterns 112 and 114 arranged similar to the left pattern 20 and right pattern 22 of the commutator disk 10. Commutator disk 110 rotates in the opposite direction of the commutator disk 10 and therefore the pattern on commutator disk 110 is the mirror image of the pattern on commutator disk 10.

Brushes 76 and 88 of commutator disk 10 are connected to the cathodes of diodes 106 and 104, respectively. The anodes of the diodes 104 and 106 are connected to the feed brushes 124 and 130 of the commutator disk 110. Brushes 124 and 130 are in contact with the most significant digit track 168 of the right pattern 114 of the commutator disk 110.

A pair of brushes 136 and 138, not previously included in the embodiment of commutator disk 10, as shown in FIGURE 2, is now included on the most significant digit tracks 36 and 24 of commutator disk 10 and are positioned adjacent feed brushes 64 and 67, respectively. Brush 136 is connected to the cathode of diode 107 and brush 138 is connected to the cathode of diode 105. The anodes of diodes 105 and 107 are connected together and to a pair of feed brushes 140 and 142 on the commutator disk 110.

Commutator disk 110 has a pair of information patterns. The left pattern 112, as illustrated in FIGURE 3, occupies one half of the disk pattern on the left side of the disk and has six tracks 144, 146, 148, 150, 152 and 154, whereas the track 144 is binary weighted $2^7$ and is the least significant digit of commutator disk 110. It should be noted, that because of the gearing between disk 10 and disk 110, the least significant track of disk 110 is one significant digit greater than the most significant digit of commutator disk 10. Tracks 146, 148, 150 and 152 and 154 increase in value respectively until track 154 is the most significant digit in the left pattern 112 of commutator disk 110 and the most significant digit of the entire encoder. Track 146 is binary weighted $2^8$, track 148 is binary weighted $2^9$, track 154 is binary weighted $2^{12}$. The most significant digit track 154 is placed outside the least significant digit track 144, as previously explained in connection with FIGURE 2.

The right pattern 114 occupies the right half of the commutator disk 110, or the opposite half that is not occupied by the left pattern 112. Right pattern 114 also has six information tracks, 158, 160, 162, 164, 166 and 168, which increase in value respectively. Each of the tracks of right pattern 114 is placed on the commutator disk 110 with the least significant of the digits on the outermost perimeter and increase in value toward the center of the commutator disk 110 where the track 168 is the most significant digit track. Track 158 is binary weighted $2^7$ and is the least significant digit of commutator disk 110, but is one significant digit greater than the most significant digit of commutator disk 10. Track 160 is binary weighted $2^8$, track 162 is binary weighted $2^9$, track 164 is binary weighted $2^{10}$, track 166 is binary weighted $2^{11}$ and track 168 is binary weighted $2^{12}$.

Two sets of readout brushes are provided on the commutator disk 110 and are placed along the diameter thereof. One set of brushes is displaced 180° from the other, as shown. One set contains brushes 178, 180, 182, 184, 186 and 188. Also placed along the diameter are feed brushes 130 and 140. Brush 178 is so positioned as to be in contact with either track 144 of the left pattern 112 for track 158 of the right pattern 114, depending upon the rotational position of the disk. Brush 180 is placed to be in contact with either track 146 of the left pattern 112, or track 160 of the right pattern 114, depending upon the rotational position of the disk. Brush 182 is similarly associated with track 148 or track 162. Brush 184 is associated with tracks 150 or 164. Readout brush 186 is associated with tracks 152 or 166, while brush 188 is only associated with the most significant track 168 of the right pattern 114.

Along the readout diameter of commutator disk 110, but 180° displaced from the first set of brushes is a second set of readout brushes 190, 192, 194, 196, 198 and 200. Also aligned along this diameter are feed brushes 124 and 142. Readout brush 190 is associated with the most significant digit track 154 of the left pattern 112, while brush 192 is associated with track 144 of the left pattern 112, or to the track 158 of the right pattern 114, depending upon the position of the commutator disk 110. Brush 194 is associated with track 160 or 146; brush 196 is associated with track 162 or track 148; brush 198 is associated with the track 164 or 150 and brush 200 is associated with track 166 or 152, depending upon the rotational position of disk 110. Readout brush 190 makes contact only with the most significant digit track 154 of the left pattern 112, as shown in FIGURE 3. All readout brushes in corresponding tracks are diode coupled, as explained in connection with FIGURE 2.

Left pattern 112 or right pattern 114 of the commutator disk 110, is enabled or not enabled in a unique manner. This is accomplished by selective switching of the left pattern 112 or the right pattern from the position of the brushes on the most significant tracks of the lower order disk 10. The left pattern 112 of the commutator disk 110 is energized or enabled from either one of two feedbrushes 140 or 142. It will be noted that no matter what is the position of the commutator disk 110, either one of the two brushes 140 or 142 is always contacting the most significant digit track 154. The right pattern 114 of disk 110 is energized or enabled from either one of two feed brushes 124 or 130. It will also be noted that no matter what is the position of disk 110, either of the two brushes 124 or 130 is always contacting the most significant track 168.

During one-half revolution of code disc 10, brushes 76 or 78 will be in continuous contact with either the left pattern 20 or the right pattern 22, supplying continuous current to the pattern 114 of code disc 110, having either brush 130 or 124 in continuous contact therewith. For the second half-revolution of code disc 10, brushes 136 and 138 are in continuous contact with either pattern 20 or 22, supplying continuous current through brushes 140 and 142, one of which is always in contact with pattern 112 of code disc 110. Therefore, the switching of the code pattern 112 and 114 is alternating every half-revolution of code disc 110.

By mechanically gearing commutator disk 10 to commutator disk 110 through the gears 202, an arrangement is made for the commutator disk 10 to rotate 64 revolutions per revolution of commutator disk 110. In the case of this embodiment, the speed reduction is 64 to 1. One revolution of the commutator disk 10 is equal to one bit change of disk 110.

Turning now to a detailed description of the operation of this invention, the count being in conventional binary readout, it is to be observed that in the position of the disk 10, as shown in FIGURE 2, the brushes are at the maximum count, or 127. As the disk 10 rotates clockwise the next readout will be 126 or 01111111. At this instance the brush 63, the readout brush for the least significant track, will be on a noncontacting segment which will so trigger the flip-flop 51 as to enable the left hand pattern 20 and to disenable the right hand pattern 22. As the disk 10 continues to rotate one more bit the brush 63 will be on a contacting segment of the least significant bit track, the flip-flop 51 will then energize or enable the right hand segment 22 and at the same time switch off or disenable the left hand pattern or segment 20. The readout brushes disposed in the lower half of the encoder in FIGURE 2, being on an electrically enabled or energized segment, will then read 1111101. So long as the disk 10 continues to rotate in a clockwise direction the count will go down from 127, or binary 1111111 to 0000000, or 0 position at the completion of 359 degrees of rotation. In the same manner if it is found desirable to go to a higher order disk, the same switching for next significant higher bits will occur on the following disk or disks, if preferable, with the left hand pattern 112 and the right hand pattern 114 being energized in whole one half segments by means of the energizing switching brushes 136 and 138 and 76 and 88, as explained above in detail. It is believed that from the foregoing it will be obvious to those skilled in the art how this invention operates.

It is contemplated that, without departing from the spirit of this invention, the pickup means need not be restricted to brushes, but revisions could be possible for the use of noncontact magnetic pickup heads, or optical devices with the use of photocells. Also it would be possible to use separate control pattern 14 to select separate coded patterns on separate disks.

What is claimed is:

1. An analog-to-digital encoder comprising:

a first code member having a first binary pattern, said first binary pattern being capable of providing a plurality of binary counts of varying significance, said first binary pattern being substantially located in a first 180 degree sector of a surface of said first code member; a second binary pattern being capable of providing a plurality of binary counts of varying significance, said second binary pattern being substantially located in the second 180 degree sector of said first code member; and a control pattern being substantially located near the outer circumference of said first code member, the control pattern being capable of alternately energizing said first and said second binary patterns;

a readout means associated with said first code member for providing a plurality of binary outputs of varying significance including a most significant digit; and a second code member having a first binary pattern, said first binary pattern being capable of providing a plurality of binary counts of varying significance, said first binary pattern being substantially located in a first 180 degree sector of a surface of said second code member; a second binary pattern being capable of providing a plurality of binary counts of varying significance, said second binary pattern being located substantially in the second 180 degree sector of the surface of said second code member, the most significant digit output of said readout means of said first code member being capable of alternately energizing said first binary pattern and said second binary pattern of said second code member.

2. An analog-to-digital encoder as defined in claim 1 and further comprising:

a bistable member having an input path and two output paths, the two output paths of said bistable member being alternately energized by the state of the input path of said bistable member, the input path of said bistable member being electrically coupled to the control pattern of said first code member, and the output paths of said bistable member being coupled to alternately electrically energize the first binary pattern and the second binary pattern of said first code member.

3. An analog-to-digital encoder comprising:

a code disc;

a least significant digit track disposed on said code disc;

a first digital pattern being disposed on said code disc, said first pattern having a plurality of digital tracks, each track of said plurality of digital tracks being of varying ordinal significance, each track of said plurality being in physical contact with all other tracks of said plurality to form said first digital pattern;

a second digital pattern on said code disc, said second pattern having a plurality of digital tracks, each track of said plurality being of varying ordinal significance, each said track of said plurality being in physical contact with all other tracks of said plurality to form said second digital pattern; said first digital pattern, said second digital pattern, and said least significant digit track being insulated from each other;

switching means coupled to said least significant digit track for alternately electrically energizing said first and said second digital patterns according to the particular condition of said least significant digit track; and means associated with said first digital pattern and said second digital pattern for reading the particular digital pattern energized by said switching means to produce an output signal indicative of the position of said code disc with respect to said means.

4. In an analog-to-digital encoder, a self-selecting, non-ambiguous information readout member comprising:

a least significant digit track being disposed on the information member, said track comprising a plurality of equally spaced segments representing alternate first and second conditions;

a first digital pattern being disposed on said information member, said first pattern comprising a first plurality of digital tracks of varying ordinal significance, each track of said first plurality being in physical contact with all other tracks of said first plurality to form said first digital pattern; and a second digital pattern being disposed on said information member, said second pattern comprising a second plurality of digital tracks of varying ordinal significance, each track of said second plurality being in physical contact with all tracks of said second plurality to form said second digital pattern; said second digital pattern, said first digital pattern, and said least significant digit track being insulated from each other.

5. In an analog-to-digital encoder, a self-selecting, non-ambiguous information readout member as defined in claim 4 and further comprising:

a first sensing means associated with said least significant digit for detecting the particular condition of the segments of said least significant track;

switching means coupled to said first sensing means for alternately electrically activating said first and said second digital patterns in response to the particular condition detected by said sensing means; and second sensing means associated with said first digital pattern and said second digital pattern for reading a particular digital pattern activated by said switching means.

6. An analog-to-digital encoder comprising:

a first code member having at least one significant digit output of at least two states; and a second code member operable in geared relationship with said first code member, said second code member having:

a first digital pattern comprising a plurality of tracks of varying ordinal significance, each track of said plurality being in physical contact with adjacent tracks of said plurality to form said first digital pattern; and a second digital pattern on said second code member, said second digital pattern comprising a plurality of tracks of varying ordinal significance, each track of said plurality being in physical contact with adjacent tracks of said plurality to form said second digital pattern, said first digital pattern and said second digital pattern being alternately energized by the state of the digit output of said first code member.

7. An analog-to-digital encoder comprising:

a commutator disc for providing an output which is coded for a digital readout, said disc having a control pattern comprising a feed track and a switching track, said switching track being capable of providing the least significant digit of the digital readout;

a first digital pattern on said commutator disc, said first digital pattern comprising a plurality of tracks of varying ordinal significance except the least significant digit track, each said track of said first digital pattern being in physical contact with all other tracks of said first digital pattern;

a second digital pattern on said commutator disc, said second digital pattern comprising a plurality of tracks of varying ordinal significance except the least significant digit track, each said track of said second digital pattern being in physical contact with all other tracks of said second digital pattern;

switching means controlled by said control pattern, said switching means being capable of electrically and alternately activating said first digital pattern and said second digital pattern in response to the particular condition of said switching tracks of said control pattern; and means associated with said first digital pattern and said second digital pattern for reading the particular digital pattern activated by said switching means.

8. In an analog-to-digital encoder, a self-selecting non-ambiguous information readout member comprising:

a commutator disc for providing an output which is coded for a digital readout, said disc including a control pattern disposed thereon, said control pattern comprising a feed track and a switching track, said switching track also provides the least significant digit of said digital readout;

a first digital pattern disposed on said commutator disc, said first digital pattern comprising a plurality of digital tracks of varying ordinal significance except the least significant digit track, each of said plurality of digital tracks being in physical contact with all other tracks of said plurality to form said first digital pattern;

a second digital pattern disposed on said commutator disc, said digital patterns comprising a plurality of digital tracks of varying ordinal significance except the least significant digit track, each said plurality of digital tracks being in physical contact with all other tracks of said plurality to form said second digital pattern; and said first digital pattern being disposed on said disc to occupy substantially 180 degrees of the surface of said disc and said second digital pattern being disposed on said disc to occupy substantially the other 180 degrees of said disc.

9. In an analog-to-digital encoder as defined in claim 8, wherein said first digital pattern is skewed on said disc by one-half bit with relation to the second said digital pattern.

10. In an analogue-to-digital encoder:

(A) a commutator disk for providing a digital output that is coded for a binary readout including:

(1) a control pattern on the surface and outermost perimeter of said commutator disk and having a feed track and a switching track wherein said switching track also provides the least significant digit of said binary readout, (2) a first binary pattern on said commutator disk including all binary tracks except the least significant digit, (3) a second binary pattern on said commutator disk and including all binary tracks except the least significant digit, said second binary pattern occupying substantially only one circumferential half of said commutator disk and said first binary pattern occupying substantially the opposite circumferential half of said commutator disk, (B) a feed brush arrangement providing a voltage for said feed track of said control pattern, (C) a readout brush on said switching track for detecting the least significant digit of said control pattern, (D) a first plurality of readout brushes associated with said first binary pattern and arranged for a binary readout of the angular shaft position of said commutator disk, (E) a second plurality of readout brushes associated with said second binary pattern and arranged for a binary readout of angular position of said commutator disk, (F) each readout brush of equally binary weighted value of said first binary pattern and said second binary pattern alternately providing the same binary readout in accordance with the determination of the position of the control pattern, (G) a bistable circuit having an input and two outputs, said input coupled to said control pattern and determining which of said two outputs are energized, the first output being connected to said first binary pattern and the second output being connected to said second binary pattern.

11. In an analogue-to-digital encoder, (A) a lower order commutator disk for providing a digital output that is coded for binary readout including:

(1) a control pattern on the surface and outermost perimeter of said lower order commutator disk and having a feedtrack and a switching track wherein said switching track also provides the least significant digit of said readout, (2) a first binary pattern on said lower order commutator disk consisting of all the binary tracks except the least significant digit, (3) a second binary pattern on said lower order commutator disk and consisting of all the binary patterns except the least significant digit, said second binary pattern being positioned on said lower order commutator disk between said control pattern and center of said lower order commutator disk and occupying substantially only one circumferential half of said lower order commutator disk, said first binary pattern occupying substantially the opposite circumferential half of said lower order commutator disk and also positioned between said control pattern and said center of said lower order commutator disk, (B) a feed brush arrangement for enabling said feedtrack of said control pattern, (C) a readout brush on said switching track for detecting the least significant digit of said control pattern, (D) a first plurality of readout brushes associated with said first pattern and arranged for a binary readout of the angular shaft position of said lower order commutator disk, (E) a second plurality of readout brushes associated with said second binary pattern and arranged for a binary readout of angular position of said lower order commutator disk and located approximately 180° from said first readout brushes, (F) each readout brush of equally weighted binary value of said first binary pattern and said second binary pattern being physically connected by diode coupling, (G) a bistable circuit having an input and two outputs, said input coupled to said control pattern and determining which of the two outputs are energized, the first output being connected to said first binary pattern and the second output being connected to said second binary pattern, (H) a higher order commutator disk for providing a digital output that is coded for a binary readout and coupled to said first commutator disk by a gear reduction corresponding to the value of the most significant digit including:

(1) a first binary pattern on said higher order commutator disk including all of the binary tracks and adapted to read at a higher order than said first binary pattern of said binary readout of said lower commutator disk, (2) a second binary pattern on said higher order commutator disk and including all of the binary tracks and having a readout of a higher order than the binary coded patterns of said lower order commutator disk, said second binary pattern being positioned on said higher orrder commutator disk between said control pattern and the center of said higher order commutator disk and occupying substantially only one circumferential half of said commutator disk, said first binary pattern occupying substantially the opposite circumferential half of said higher order commutator disk and also being positioned between said control pattern and said center of said higher order commutator disk, (3) means enabling either said first binary pattern or said second binary pattern of said higher order commutator disk alternately in accordance with the position of said lower order commutator, said first binary pattern of said higher order commutator disk being enabled when said lower order disk is in the first 180° of its rotation and enabling said second binary pattern of said higher order commutator disk when said lower order commutator disk is in its second 180° of its rotation.

12. In an analogue-to-digital encoder, a self-selecting non-ambiguous information readout member comprising:

(A) a commutator disk for providing a digital output that is coded for a binary readout including, a control pattern on the surface and outermost perimeter of said commutator disk and having a feed track and a switching track providing the least significant digit of said binary readout, (B) a first binary pattern on said commutator disk including all binary tracks except the least significant digit, and (C) a second binary pattern on said commutator disk including all binary tracks except the least significant digit, said second binary pattern occupying substantially only one circumferential half of said commutator disk and said first binary pattern occupying substantially the opposite circumferential half of said commutator disk, (D) said first binary pattern having its most significant digit adjacent the center of said commutator disk, and (E) said second binary pattern having its most significant digit located adjacent said control pattern and lying between second least significant digit of said second binary pattern and said control pattern.

13. In an analogue-to-digital encoder:

(A) a commutator disk for providing a digital output that is coded for a binary readout including:

(1) a control pattern on the surface and outermost perimeter of said commutator disk and having a feed track and a switching track wherein said switching track also provides the least significant digit of said binary readout, (2) a first binary pattern on said commutator disk including all binary tracks except the least significant and having its most significant digit track positioned adjacent the center of said commutator disk, (3) a second binary pattern on said commutator disk and including all binary tracks except the least significant digit and having its most significant digit track positioned adjacent said control pattern and lying between said control pattern and second least significant digit of said second binary pattern, said second binary pattern occupying substantially only one circumferential half of said commutator disk and said first binary pattern occupying substantially the opposite circumferential half of said commutator disk, (B) a feed brush arrangement providing a voltage for said feed track of said control pattern, (C) a readout brush on said switching track for detecting the least significant digit of said control pattern, (D) a first plurality of readout brushes associated with said first binary pattern and arranged for a binary readout of the angular shaft position of said commutator disk, (E) a second plurality of sense brushes associated with said second binary pattern and arranged for a binary readout of angular position of said commutator disk, (F) each readout brush of equally binary weighted value of said first binary pattern and said second binary pattern alternately providing the same binary readout in accordance with the determination of the position of the control pattern, (G) a bistable circuit having an input and two outputs, said input coupled to said control pattern and determining which of said two outputs are energized, the first output being connected to said first binary pattern and the second output being connected to said second binary pattern.

References Cited by the Examiner

UNITED STATES PATENTS

| | | | |
|---|---|---|---|
| 2,873,442 | 2/1959 | Ziserman | 340—347 |
| 3,070,789 | 12/1962 | Kristy | 340—347 |

MAYNARD R. WILBUR, *Primary Examiner.*

DARYL W. COOK, *Examiner.*

W. J. KOPACZ, *Assistant Examiner.*